(12) United States Patent
Naimark

(10) Patent No.: US 8,531,590 B2
(45) Date of Patent: Sep. 10, 2013

(54) CAMERA WITH PRECISE VISUAL INDICATOR TO SUBJECT WHEN WITHIN CAMERA VIEW

(75) Inventor: Michael Naimark, Long Island City, NY (US)

(73) Assignee: University of Southern California, Los Angeles, CA (US)

( * ) Notice: Subject to any disclaimer, the term of this patent is extended or adjusted under 35 U.S.C. 154(b) by 360 days.

(21) Appl. No.: 12/841,063

(22) Filed: Jul. 21, 2010

(65) Prior Publication Data

US 2011/0019073 A1    Jan. 27, 2011

Related U.S. Application Data

(60) Provisional application No. 61/227,682, filed on Jul. 22, 2009.

(51) Int. Cl.
*H04N 5/222* (2006.01)
*H04N 5/232* (2006.01)
*H04N 5/225* (2006.01)

(52) U.S. Cl.
USPC ........................ 348/370; 348/349; 348/207.99

(58) Field of Classification Search
USPC ............ 348/207.99, 272–273, 296, 335–337, 348/370, 349; 396/89
See application file for complete search history.

(56) References Cited

U.S. PATENT DOCUMENTS

| | | | |
|---|---|---|---|
| 5,565,947 A | 10/1996 | Chamberlain, IV | |
| 6,178,297 B1 | 1/2001 | Ting | |
| 6,191,818 B1 * | 2/2001 | Koizumi | 348/333.01 |
| 6,516,151 B2 | 2/2003 | Pilu | |
| 6,704,506 B2 | 3/2004 | Sasagawa | |

(Continued)

FOREIGN PATENT DOCUMENTS

| JP | 10243267 A | 9/1998 |
|---|---|---|
| JP | 2003125237 A1 | 4/2003 |
| JP | 2006301418 A | 11/2006 |

OTHER PUBLICATIONS

PROCAMS—2003, IEEE Workshop on Projector-Camera Systems, Oct. 12, 2003, Nice, France. Two-page summary of workshop downloaded Dec. 21, 2010 from http://www.procams.org/procams2003/.

(Continued)

*Primary Examiner* — Trung Diep
(74) *Attorney, Agent, or Firm* — McDermott Will & Emery LLP

(57) ABSTRACT

A camera may include a lens, an image sensor, an image detection system, a controllable light source, and a light source control system. The image detection system may be configured to generate electronic information representative of images generated by the lens by detecting sequential images sensed by the image sensor. The detecting may not be done during certain periods of time. The controllable light source may be behind the lens and configured to controllably project light through the lens and back onto a scene in front of the lens. While in at least one mode, the light source control system may be configured to activate the controllable light source only while the image detection system is not detecting an image from the image sensor. The light source control system may be configured to activate the controllable light source and to cause it to emit light at an intensity which is sufficient to be readily visible to a normal human looking at the lens while within the scene, but not sufficient to materially alter the electronic information generated by the image detection system.

22 Claims, 3 Drawing Sheets

(56) References Cited

U.S. PATENT DOCUMENTS

| | | | |
|---|---|---|---|
| 7,355,648 B1* | 4/2008 | Braun et al. | 348/370 |
| 7,414,669 B2 | 8/2008 | Chang et al. | |
| 2003/0147637 A1 | 8/2003 | Sasagawa | |

OTHER PUBLICATIONS

PROCAMS 2005, IEEE International Workshop on Projector-Camera Systems, Jun. 25, 2005, San Diego, California. Three-page summary of workshop downloaded Dec. 21, 2010 from http://www.procams.org/procams2005/.

PROCAMS 2006, IEEE International Workshop on Projector-Camera Systems, Jun. 17, 2006, New York, New York. Two-page summary of workshop downloaded Dec. 21, 2010 from http://www.procams.org/procams2006/.

PROCAMS 2007, IEEE International Workshop on Projector-Camera Systems, Jun. 18, 2007, Minneapolis, Minnesota. One-page summary of workshop downloaded Dec. 21, 2010 from http://www.procams.org/procams2007/.

PROCAMS 2008, 5th ACM/IEEE International Workshop on Projector-Camera Systems, Aug. 10, 2008, Marina del Rey, California. Two-page summary of workshop downloaded Dec. 21, 2010 from http://www.procams.org/procams2008/.

PROCAMS 2010, IEEE International Workshop on Projector-Camera Systems, Jun. 18, 2010, San Francisco, California. One-page summary of workshop downloaded Dec. 21, 2010 from http://www.cs.cmu.edu/~ILIM/ProCams2010/.

International Search Report and Written Opinion of the International Searching Authority, mailed Feb. 9, 2011, for PCT Application No. PCT/US2010/042904, filed Jul. 20, 2010.

\* cited by examiner

CAMERA WITH PRECISE VISUAL INDICATOR TO SUBJECT WHEN WITHIN CAMERA VIEW

CROSS-REFERENCE TO RELATED APPLICATION

This application is based upon and claims priority to U.S. provisional patent application 61/227,682, entitled "PROVIDING REAL-TIME DATA FOR AND ABOUT SUBJECTS WITHIN A CAMERA'S VIEW," filed Jul. 22, 2009. The entire content of this application is incorporated herein by reference.

BACKGROUND

1. Technical Field

This disclosure relates to cameras, including cameras that provide a tally light to indicate when the camera is active.

2. Description of Related Art

Some video cameras include what is known as a "tally light." The light is usually mounted on the outside of the camera and turned on when the camera is active. The light lets people in front of the camera know when the camera is active so that they can conduct themselves accordingly. When multiple cameras are used, such as in news room sets, the tally light may function to indicate which of the cameras is active, thereby allowing news casters to know which camera to look at. Tally lights on studio video cameras are typically large and red.

Tally lights also now appear on consumer video camcorders. They are often less prominent (e.g., a small red LED) and may be able to be disabled via the camera's settings menu. These are often referred to as "camera recording lamps." They are typically unobtrusive, but visible to anyone looking for them.

Although helpful, a subject may still not be able to determine whether she is within the field of view of the camera. This may cause the subject to think that the subject is being photographed when the subject is not, or vice versa.

SUMMARY

A camera may include a lens, an image sensor, an image detection system, a controllable light source, and a light source control system.

The lens may be configured to generate sequential images of a scene in front of the lens.

The image sensor may be configured to sense the sequential images of the scene.

The image detection system may configured to generate electronic information representative of the sequential images by detecting the sequential images sensed by the image sensor. The detecting may not be done during certain periods of time.

The controllable light source may be behind the lens and configured to controllably project light through the lens and back onto the scene.

The light source control system may be configured, while in at least one mode, to activate the controllable light source only while the detecting is not being done.

The image detection system may be configured not to detect the images sensed by the image sensor during blanking intervals. The light source control system may be configured to activate the controllable light source only during the blanking intervals.

The camera may include a programmable shutter. The image detection system may be configured not to detect the images sensed by the image sensor while the programmable shutter is closed. The light source control system may be configured to activate the controllable light source only while the programmable shutter is closed.

The controllable light source may be configured to emit the light at controllable locations within the scene. The light source control system may be configured to control the locations at which the controllable light source emits the light in accordance with a location-control instruction.

The controllable light source may be configured to emit the light at a controllable color. The light source control system may be configured to control the color of the controllable light source in accordance with a color-control instruction.

The light source control system may be configured to control the locations at which the controllable light source emits the light in accordance with the location-control instruction and to control the color in accordance with the color-control instruction such that the location-control instruction and the color-control instruction can collectively cause the controllable light source to emit a different color at different locations within the scene.

The controllable light source may be configured to emit the light at a controllable intensity. The light source control system may be configured to control the intensity of the controllable light source in accordance with an intensity-control instruction. The light source control system may be configured such that the intensity-control instruction can dictate whether the light is constantly on or blinking and/or whether the light is blinking at a first rate or a different second rate.

The light source control system may be configured, while in another mode, to activate the controllable light source while the detecting is being done.

The image sensor and the controllable light source may both be part of a single integrated chip.

The camera may have a field of view and the light emitted by the controllable light source may be configured to illuminate substantially all objects within the field of view, but substantially no objects outside of the field of view.

The light source control system may be configured to activate the controllable light source and to cause it to emit light at an intensity which is sufficient to be readily visible to a normal human looking at the lens while within the scene, but not sufficient to materially alter the electronic information generated by the image detection system. The controllable light source may include a solid state laser emitting diode.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings disclose illustrative embodiments. They do not set forth all embodiments. Other embodiments may be used in addition or instead. Details which may be apparent or unnecessary may be omitted to save space or for more effective illustration. Conversely, some embodiments may be practiced without all of the details which are disclosed. When the same numeral appears in different drawings, it refers to the same or like components or steps.

DETAILED DESCRIPTION OF ILLUSTRATIVE EMBODIMENTS

Illustrative embodiments are now discussed. Other embodiments may be used in addition or instead. Details which may be apparent or unnecessary may be omitted to save space or for a more effective presentation. Conversely, some embodiments may be practiced without all of the details which are disclosed.

Figure 1:
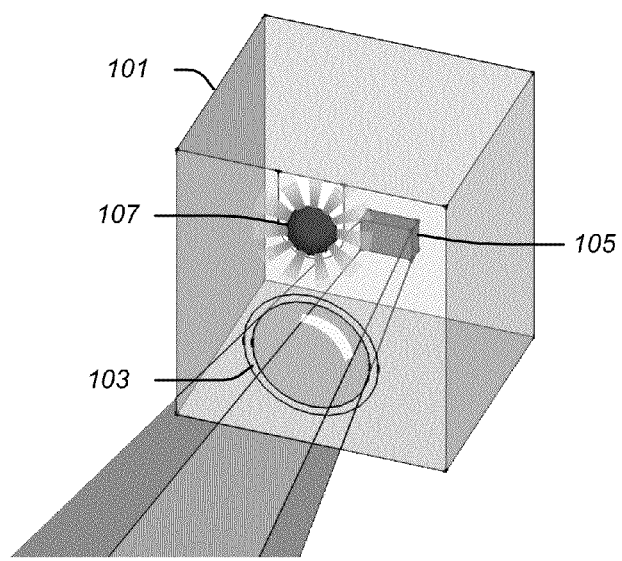
FIG. 1 illustrates a prior art camera with an external tally light.

FIG. 1 illustrates a prior art camera with an external tally light.

As illustrated in FIG. 1, a prior art camera 101 includes a lens 103 configured to generate images of a scene and an image sensor 105 configured and located to capture those images. A tally light 107 is provided on the exterior of the camera and configured through appropriate electronics to illuminate when the camera is active, i.e., when the camera is capturing one or more images. This tally light may alert people to when the camera 101 is active, but may not be sufficient to let them know whether they are within the field of view of the camera 101.

Figure 2:
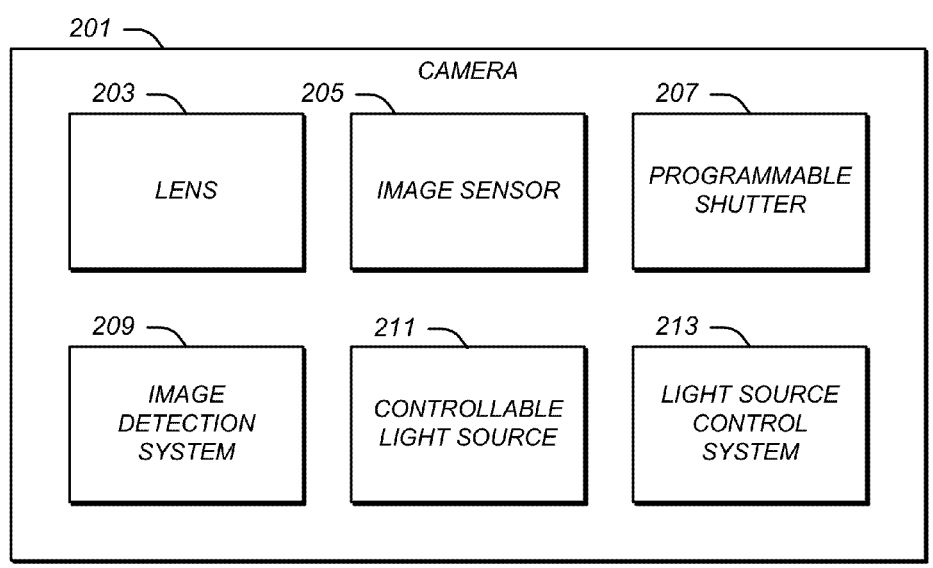
FIG. 2 is a block diagram of a camera with a behind-the-lens tally light.

FIG. 2 is a block diagram of a camera with a behind-the-lens tally light. As illustrated in FIG. 2, a camera 201 may include a lens 203, an image sensor 205, a programmable shutter 207, an image detection system 209, a controllable light source 211, and a light source control system 213. The camera 201 may include additional components and/or not all of these components.

The lens 203 may be configured to generate sequential images of a scene. An image sensor 205 may be configured and positioned to sense the sequential images of the scene generated by the lens 203. The lens 203 may be a single lens or a group of lens with or without additional optics.

The image sensor 205 may be positioned behind the lens and may be of any type. For example, the image sensor may include a two-dimensional array of light-sensitive elements, such as a CCD. The image sensor 205 may be configured to sense the color of the image, as well as its intensity. For this purpose, three separate light-sensitive arrays may be used, each preceded by a red, green, or blue filter, all of which may be aligned and configured with appropriate optics to see the same image of the scene. A single array of light-sensitive elements may instead be used with each light-sensitive element consisting of three light-sensitive sub-elements, each preceded by a red, green, or blue filter.

A programmable shutter 207 may be configured to control the amount of light which is sensed by the image sensor 205 by being open only for a programmable amount of time during the sensing of each of the sequential images.

The image detection system 209 may include electronics configured to generate electronic information that is representative of the sequential images that are generated by the lens 203. The image detection system 209 may do so by detecting the sequential images sensed by the image sensor 205. The image detection system may be configured not to perform this detecting during certain periods of time. In other words, there may be certain periods of time when the image cast upon the image sensor 205 by the lens 203 has no effect on the electronic information which is generated by the image detection system 209. Examples of these time periods are discussed below The controllable light source 211 may be positioned behind the lens 203 and configured to controllably project light through the lens 203 and back onto the scene. More details about the controllable light source 211 are provided below.

The light source control system 213 may be configured to activate the controllable light source 211. While in at least one mode, the light source control system 213 may be configured to do so only while the image detection system 209 is not detecting the sequential images sensed by the image sensor 205. Examples of this timing are described below. The light source control system 213 may include appropriate electronics which are synchronized with the electronics in the image detection system 209 to effectuate this coordinated timing.

A focusing system (not shown in FIG. 2) may be provided in connection with the controllable light source 211 to cause all of the light which it emits to travel through the lens 203. This focusing system may be separate from the controllable light source 211, such as in front of it, or a chip along with the controllable light source 211.

The controllable light source 211 may be configured to emit light at any desired intensity. The light source control system 213 may correspondingly be configured to control that intensity. Examples of how this control may be exercised are set forth below.

While in at least one other mode, the light source control system 213 may be configured to activate the controllable light source 211 while the image detection system 209 detects the sequential images sensed by the image sensor 205. This may be referred to as "in-phase" lighting, as contrasted to the "out-of-phase" lighting discussed above. During in-phase lighting, as well as during out-of phase lighting, the intensity of the light emitted by the controllable light source 211 may be controlled by the light source control system 213 so as to be sufficient to be readily visible to a normal human looking at the camera 201 while within the scene, but not sufficient to materially alter the electronic image generated by the image detection system 209 due to the light emitted by the controllable light source 211. During this mode or modes of operation, for example, the intensity of the light emitted by the controllable light source 211 may be no more than one-half, one, two, three, or five watts, and/or consistent with output levels of current LED light sources.

The controllable light source 211 may include one or more LEDs, such as one or more solid state laser emitting diodes. These laser diodes may be class IIIa lasers which emit no more than 5 mw of power and which are commonly used in laser pointers.

The intensity of the controllable light source 211 may be greater. When this occurs, however, the light source control system 213 may be configured, while at least in one mode, to activate the controllable light source 211 only while the image detection system 209 is not detecting sequential images sensed by the image sensor 205, as explained above.

Depending upon how the image detection system 209 is configured, there may be several different types of periods during which the image detection system 209 is not detecting the sequential images sensed by the image sensor 205.

In some systems, for example, the image detection system 209 may be configured not to sense these images during the horizontal and/or vertical blanking intervals associated with the horizontal and vertical flyback of an electronic beam in a cathode ray tube. In these configurations, the light source control system 213 may be configured, while in this mode, to activate the controllable light source 211 only during the vertical and/or horizontal blanking intervals. The perceived intensity of the controllable light source 211 may be regulated by the length of time the light source control system 213 is configured to activate the controllable light source 211 during each of these blanking intervals, and/or by not activating the controllable light source 211 during each of these intervals.

The programmable shutter 207 may effectively prevent the image detection system 209 from detecting the sequential images that are sensed by the image sensor 205 while the programmable shutter 207 is closed. In this configuration, the light source control system 213 may be configured to activate the light source only while the programmable shutter 207 is closed. Again, the perceived intensity of the controllable light source 211 may be regulated by the amount of time during these intervals which the light source control system 213 is configured to activate the controllable light source 211, and/or by not activating the controllable light source 211 during each of these closed intervals.

The controllable light source 211 may be configured to emit light at controllable locations within the scene. For example, the controllable light source 211 may include an array of pixel elements which may be separately controllable. In this configuration, the light source control system 213 may be configured to control the locations at which the controllable light source 211 emits the light by controlling which pixels in the controllable light source 211 are actuated. The light source control system 213 may be configured to do so in accordance with a location-control instruction provided to the camera 201. Thus, the locations at which light from the controllable light source 211 may be viewed from outside of the camera may be controlled by the location-control instruction.

The controllable light source 211 may be configured to emit light at a controllable color. Red, green and blue LEDs may be used for this purpose. The light source control system 213 may correspondingly be configured to control the color of the controllable light source 211. The light source control system 213 may be configured to do so in accordance with a color-control instruction. In other words, the color of the light from the controllable light source 211 may be controlled by the color-control instruction.

The controllable light source 211 may be configured to emit light at both controllable locations and at a controllable color. For example, the controllable light source 211 may include a matrix of pixel elements, each pixel element included a red, green, and blue LED. The light source control system 213 may correspondingly be configured to control both of these parameters in accordance with the location-control and the color-control instruction. In this configuration, the location-control and the color-control instructions may control both the location and the color emitted by the controllable light source 211, providing the opportunity for different color light to be provided at different locations.

In one configuration, for example, a red light may be provided in the central area of the field of view of the camera, while a blue light may be provided in areas peripheral to the central area of the field of view, but which are still within the field of view. In still other configurations, no light may be provided in areas which are on the periphery of the central area of the camera's field of view.

The controllable light source 211 may be configured to emit the light at a controllable intensity. The light source control system 213 may be configured to control the intensity of the controllable light source 211. The light source control system 213 may be configured to do so in accordance with an intensity-control instruction. Thus, the intensity-control instruction may be able to control the intensity of the light emitted by the controllable light source 211.

The manner in which the light source control system 213 may be configured to control the intensity of the light emitted by the controllable light source 211 may vary. For example, the light source control system 213 may be configured such that the intensity-control instruction can dictate whether the light is constantly on or blinking. In another configuration, the light source control system 213 may be configured such that the intensity-control instruction can dictate whether the light is blinking at a first rate or a different second rate. In a still further configuration, the light may always remain on, but its intensity level may be changed.

The controllable light source 211 and the light source control system 213 may be configured to vary more than one of these parameters at the same time, thus allowing the control instructions to simultaneously control the location, color, and/or intensity of the light which is emitted by the controllable light source 211. These subsystems may be configured to enable the control instructions to control any two of these parameters and/or all three simultaneously.

The control instructions may be formulated in a manner to cause the light emitted by the controllable light source 211 to communicate information to those that can see it, such as information about the status of the camera, and/or instructions about what the subject should do.

The camera 201 may be configured to allow the control instructions to be communicated to it in any way. For example, the camera may include one or more user-controls which may enable a user of the camera to issue one or more of the control instructions. For example, the camera 201 may include a user-operated control which may enable the user to select whether the light emitted by the controllable light source 211 is constantly on, blinking at a slow rate, or blinking at a fast rate. Similarly, the camera 201 may include a user-control which may enable the user to select whether the light occupies the full view of the camera or some sub-portion of that view, such as a sub-portion which has a dark perimeter margin of uniform width or at a different aspect ratio. Similarly, the camera 201 may provide a user control which may enable a user to select from among several different colors for the light emitted by the controllable light source 211. The light source control system 213 may be configured to recognize and implement control instructions from all of these controls simultaneously.

The camera 201 may in addition or instead be configured to receive the control instructions from a source other than the operator of the camera, such as from a camera control room. In this situation, the camera 201 may be configured with appropriate data communication technology to enable external commands from such remote locations to reach the light source control system 213. The communication system may include wired and/or wireless links.

The camera 201 may in addition or instead be configured to receive the control instructions in the form of computer software instructions which may be downloaded loaded into the camera 201, either before or during use.

When operating in an in-phase mode, the light source control system 213 may be configured to cause the controllable light source 211 to emit light at an intensity level which is sufficient to alter the electronic information generated by the image detection system 209 that is representative of the sequential images sensed by the image sensor 205. For example, the intensity may high enough to provide supplemental, shadow-less illumination. In another example, this in-phase lighting may be used to project "structured light," such as a checkerboard or grid on the scene, thus providing an indication of the distance between objects in the scene and the camera 201. Bright, in-phase illumination may also be used to project special effects, such as to add virtual objects to the scene. Dim illumination may in addition or instead be used to provide retro-reflective markers, such as dots, which may be useful in connection with generating 3D data points for objects within the scene.

Although traditional tally lights are not usually activated prior to activation of the camera, the behind-the-lens tally light which has been discussed herein may be activated both before and after activation of the camera.

Various combinations of these options may support a broad variety of applications from professional filming to amateur cameras. For example, the technology may enable grips and extras to position themselves as closely as possible to a scene with confidence that will not be accidentally filmed as part of the scene.

The wavelength of the light emitted by the controllable light source 211 may be in the visible or invisible range. For example, the wavelength may be in the UV and/or IR spectrum. This may be useful for scientific applications, such as environmental monitoring.

The image sensor 205 and the controllable light source 211 may be separate devices or they may be consolidated and made part of a single integrated chip using micro-optical engineering techniques.

Figure 3:
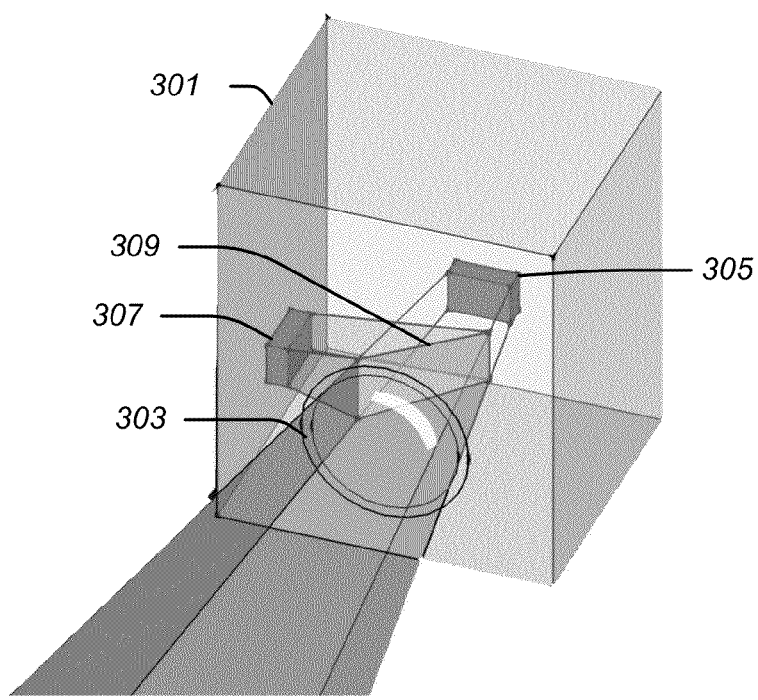
FIG. 3 illustrates components of a camera with a behind-the-lens tally light.

FIG. 3 illustrates components of a camera 301 with a behind-the-lens tally light. The camera 301 illustrated in FIG. 3 may contain the components discussed above in connection with the camera 201 illustrated in FIG. 2, may contain additional components, or may not contain all of those components. Similarly, the camera 201 illustrated in FIG. 2 may have a composition different than the camera 301 illustrated in FIG. 3.

As illustrated in FIG. 3, the camera 301 may include a lens 303, an image sensor 305, a controllable light source 307, and optics 309. These may correspond to the components with the same name that are illustrated in FIG. 2 and discussed above. Other components may be in the camera 301, such as the other components illustrated in FIG. 2, but have been omitted for simplicity.

The lens 303 may be configured to generate sequential images of a scene and to focus them on the image sensor 305. Similarly, the optics 309 may be configured to enable light from the controllable light source 307 to be merged onto the same axis as the light which is provided to the image sensor 305 by the lens 303. The optics 309 may be of any type to facilitate this functionality. For example, the optics 309 may consist of or include a beam splitter, such as a prism and/or a half-silvered mirror.

Figure 4:
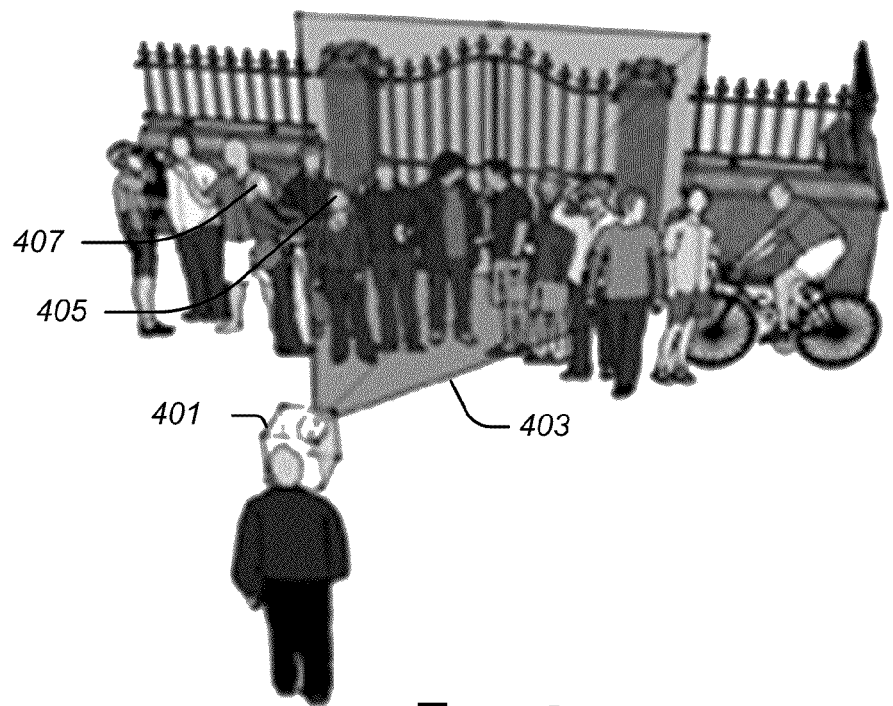
FIG. 4 illustrates a precise tally light which a camera with a behind-the-lens tally light may provide.

FIG. 4 illustrates a precise tally light which a camera with a behind-the-lens tally light may provide. As illustrated in FIG. 4, a camera 401 may emit a tally light 403 which illuminates substantially all objects within the field of view of the camera 401, but substantially no objects outside of the field. The camera 401 may be of the type described above in connection with the camera 201 and/or the camera 301. The camera 401 may enable people within the field of view, such as a person 405, to know that they are within the field of view because they can see the tally light. It may also enable people outside of the field of view, such as a person 407, to know that they are not within the field of view because they cannot see the tally light.

When the image sensor 305 is configured to sense color and/or the controllable light source 307 is configured to emit light of a controllable color, each of these components may, in fact, consist of three separate components, each proceeded by a red, green, or blue filter. In this configuration, additional optics may be provided to ensure that the light received and/or delivered by each of these components also falls on the axis of the image captured by the lens 303.

Figure 5:
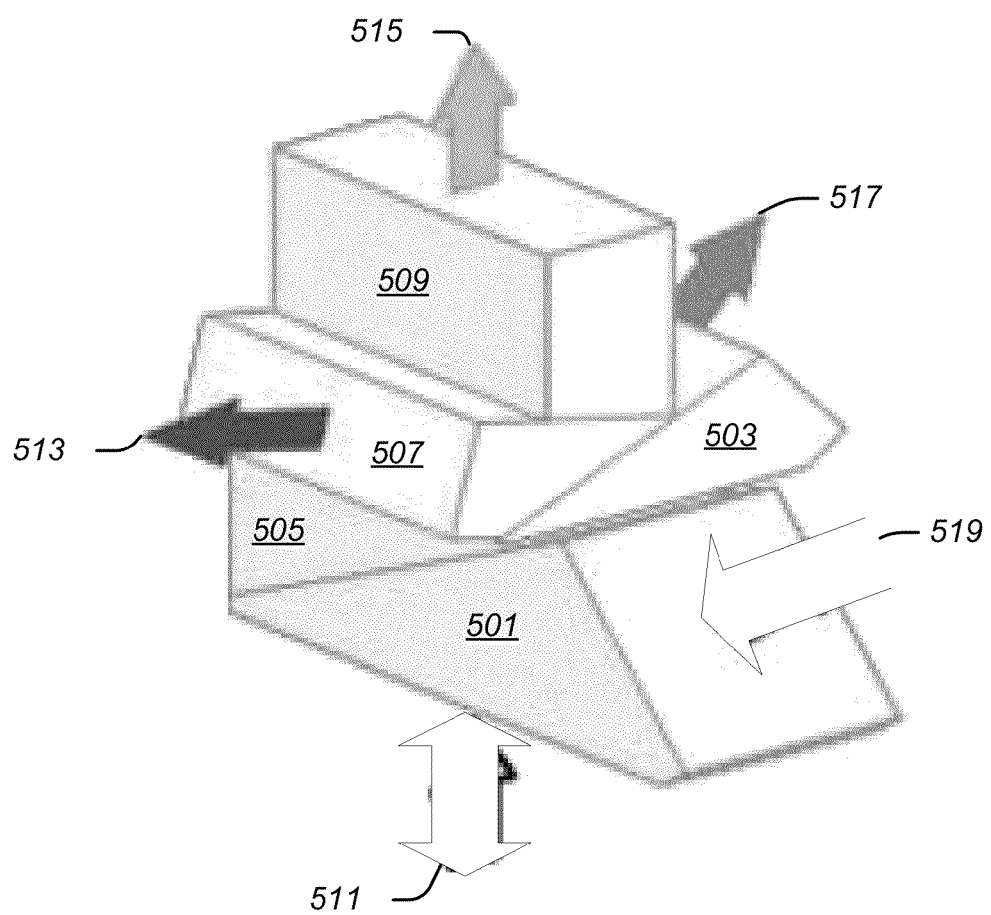
FIG. 5 illustrates a configuration of prisms that may be used to integrate a controllable light source with an image sensor that includes three separate color sensors so that the images seen by each of the three color sensors and the light emitted by the controllable light source all travel along substantially the same axis.

FIG. 5 illustrates a configuration of prisms that may be used to integrate a controllable light source with an image sensor that includes three separate color sensors so that the images seen by each of the three color sensors and the light emitted by the controllable light source all travel along substantially the same axis. As illustrated in FIG. 5, prisms 501, 503, 505, 507, and 509 may be shaped and oriented so as to cause an incoming image along an axis 511 from behind a camera lens (not shown in FIG. 5), such as the camera lens 203 shown in FIG. 2, to be split into three equal images along axes 513, 515, and 517. Each of these images, in turn, may be filtered by a red, green, or blue filter and then delivered to a CCD or other type of image sensor. These three sensors may collectively form the image sensor 205 illustrated in FIG. 2.

Light from the controllable light source 211 may simultaneously be directed along an axis 519 and bent by the prism 501 so as to exit the prism 501 along the same axis 511 as the incoming image. The dimensions of the controllable light source 211 may be configured to substantially match the dimensions of the individual CCD sensors so as to insure that the light emitted by the from the controllable light source 211 illuminates substantially all objects within the field of view of the camera, but substantially no objects outside of the field of view.

The components, steps, features, objects, benefits and advantages which have been discussed are merely illustrative. None of them, nor the discussions relating to them, are intended to limit the scope of protection in any way. Numerous other embodiments are also contemplated. These include embodiments which have fewer, additional, and/or different components, steps, features, objects, benefits and advantages. These also include embodiments in which the components and/or steps are arranged and/or ordered differently.

For example, the camera may include an old-fashioned tally light on the exterior of the camera. This maybe useful to inform persons outside of the field of view that the camera active. These person may also be able to determine whether they are within the field of view of the camera based on whether they also see light coming from behind the camera lens.

As another example, the light intensity may also simulate "breathing." This is a technique sometimes used on laptop computers to indicate sleep mode.

As another example, the light may modulate in synchronism with an external speaker on or near the camera, as if the camera were "alive," giving the effect of a communicating "HAL"-like computer, as in the movie "2001."

Unless otherwise stated, all measurements, values, ratings, positions, magnitudes, sizes, and other specifications which are set forth in this specification, including in the claims which follow, are approximate, not exact. They are intended to have a reasonable range which is consistent with the functions to which they relate and with what is customary in the art to which they pertain.

All articles, patents, patent applications, and other publications which have been cited in this disclosure are hereby incorporated herein by reference.

The phrase "means for" when used in a claim is intended to and should be interpreted to embrace the corresponding structures and materials which have been described and their equivalents. Similarly, the phrase "step for" when used in a claim is intended to and should be interpreted to embrace the corresponding acts which have been described and their equivalents. The absence of these phrases in a claim mean that the claim is not intended to and should not be interpreted to be limited to any of the corresponding structures, materials, or acts or to their equivalents.

Nothing which has been stated or illustrated is intended or should be interpreted to cause a dedication of any component, step, feature, object, benefit, advantage, or equivalent to the public, regardless of whether it is recited in the claims.

The scope of protection is limited solely by the claims which now follow. That scope is intended and should be interpreted to be as broad as is consistent with the ordinary meaning of the language which is used in the claims when interpreted in light of this specification and the prosecution history which follows and to encompass all structural and functional equivalents.

The invention claimed is:

1. A camera comprising:
   a lens configured to generate sequential images of a scene which is in front of the lens;
   an image sensor configured to sense the sequential images of the scene;
   an image detection system configured to generate electronic information representative of the sequential images by detecting the sequential images sensed by the image sensor, the detecting not being done during certain periods of time;
   a controllable light source behind the lens and configured to controllably project light through the lens and back onto the scene; and
   a light source control system configured to activate the controllable light source,
   wherein the camera, including the light source control system, is configured to activate the controllable light source only while the detecting is not being done.

2. The camera of claim 1 wherein:
   the image detection system is configured not to detect the images sensed by the image sensor during blanking intervals; and
   the light source control system is configured to activate the controllable light source only during the blanking intervals.

3. The camera of claim 1 further comprising a programmable shutter and wherein:
   the image detection system is configured not to detect the images sensed by the image sensor while the programmable shutter is closed; and
   the light source control system is configured to activate the controllable light source only while the programmable shutter is closed.

4. The camera of claim 1 wherein:
   the controllable light source is configured to emit the light at controllable locations within the scene; and
   the light source control system is configured to control the locations at which the controllable light source emits the light in accordance with a location-control instruction.

5. The camera of claim 1 wherein:
   the controllable light source is configured to emit the light at a controllable color; and
   the light source control system is configured to control the color of the controllable light source in accordance with a color-control instruction.

6. The camera of claim 5 wherein:
   the controllable light source is configured to emit the light at controllable locations within the scene; and
   the light source control system is configured to control the locations at which the controllable light source emits the light in accordance with a location-control instruction and to control the color in accordance with the color-control instruction such that the location-control instruction and the color-control instruction can collectively cause the controllable light source to emit a different color at different locations within the scene.

7. The camera of claim 1 wherein:
   the controllable light source is configured to emit the light at a controllable intensity; and
   the light source control system is configured to control the intensity of the controllable light source in accordance with an intensity-control instruction.

8. The camera of claim 7 wherein the light source control system is configured such that the intensity-control instruction can dictate whether the light is constantly on or blinking.

9. The camera of claim 7 wherein the light source control system is configured such that the intensity-control instruction can dictate whether the light is blinking at a first rate or a different second rate.

10. The camera of claim 1 wherein the image sensor and the controllable light source are both part of a single integrated chip.

11. The camera of claim 1 wherein the camera has a field of view and the light emitted by the controllable light source is configured to illuminate substantially all objects within the field of view, but substantially no objects outside of the field of view.

12. A camera comprising:
    a lens configured to generate an image of a scene in front of the lens;
    an image sensor configured to sense the image of the scene;
    an image detection system configured to generate electronic information representative of the image by detecting the image sensed by the image sensor;
    a controllable light source behind the lens and configured to controllably project light through the lens and back onto the scene; and
    a light source control system configured to activate the controllable light source and to cause it to emit light at an intensity which is sufficient to be readily visible to a normal human looking at the lens while within the scene, but not sufficient to materially alter the electronic information generated by the image detection system.

13. The camera of claim 12 wherein the light source control system is configured to activate the controllable light source while the image detection system is detecting the image sensed by the image sensor.

14. The camera of claim 12 wherein the controllable light source includes a solid state laser emitting diode.

15. The camera of claim 12 wherein:
    the controllable light source is configured to emit the light at controllable locations within the scene; and
    the light source control system is configured to control the locations at which the controllable light source emits the light in accordance with a location-control instruction.

16. The camera of claim 12 wherein:
    the controllable light source is configured to emit the light at a controllable color; and
    the light source control system is configured to control the color of the controllable light source in accordance with a color-control instruction.

17. The camera of claim 16 wherein:
    the controllable light source is configured to emit the light at controllable locations within the scene; and
    the light source control system is configured to control the locations at which the controllable light source emits the light in accordance with a location-control instruction and to control the color in accordance with the color-control instruction such that the location-control instruction and the color-control instruction can cause the controllable light source to emit a different color at different locations within the scene.

18. The camera of claim 12 wherein:
the controllable light source is configured to emit the light at a controllable intensity; and
the light source control system is configured to control the intensity of the controllable light source in accordance with an intensity-control instruction.

19. The camera of claim 18 wherein the light source control system is configured such that the intensity-control instruction can dictate whether the light is constantly on or blinking.

20. The camera of claim 18 wherein the light source control system is configured such that the intensity-control instruction can dictate whether the light is blinking at a first rate or a different second rate.

21. The camera of claim 18 wherein the image sensor and the controllable light source are both part of a single integrated chip.

22. The camera of claim 18 wherein the camera has a field of view and the light emitted by the controllable light source is configured to illuminate substantially all objects within the field of view, but substantially no objects outside of the field of view.

* * * * *